(12) United States Patent
Yilmaz

(10) Patent No.: US 12,195,162 B2
(45) Date of Patent: Jan. 14, 2025

(54) HELICOPTER TAIL FOLDING SYSTEM

(71) Applicant: TUSAS-TURK HAVACILIK VE UZAY SANAYII ANONIM SIRKETI, Ankara (TR)

(72) Inventor: Furkan Yilmaz, Ankara (TR)

(73) Assignee: TUSAS-TURK HAVACILIK VE UZAY SANAYII ANONIM SIRKETI, Ankara (TR)

(*) Notice: Subject to any disclaimer, the term of this patent is extended or adjusted under 35 U.S.C. 154(b) by 0 days.

(21) Appl. No.: 18/521,126

(22) Filed: Nov. 28, 2023

(65) Prior Publication Data
US 2024/0174337 A1 May 30, 2024

(30) Foreign Application Priority Data
Nov. 30, 2022 (TR) ................. 2022/018277

(51) Int. Cl.
*B64C 1/06* (2006.01)
*B64C 27/50* (2006.01)

(52) U.S. Cl.
CPC .............. *B64C 1/063* (2013.01); *B64C 27/50* (2013.01)

(58) Field of Classification Search
CPC ........... B64C 1/063; B64C 27/50; B64C 3/56; B64C 27/04; B64C 27/82
See application file for complete search history.

(56) References Cited

U.S. PATENT DOCUMENTS

| | | | | |
|---|---|---|---|---|
| 5,186,573 A * | 2/1993 | Flotow | ................. | F16D 1/101 464/169 |
| 5,672,112 A * | 9/1997 | Sbabo | ................. | F16D 3/185 464/177 |
| 6,050,521 A * | 4/2000 | Regonini | ................. | B64C 1/063 464/154 |
| 6,168,530 B1 * | 1/2001 | Guimbal | ................. | B64D 35/00 464/178 |
| 7,771,126 B2 * | 8/2010 | Faass | ................. | F16C 19/18 248/580 |
| 10,287,005 B2 * | 5/2019 | Spears | ................. | F16C 32/0425 |

* cited by examiner

*Primary Examiner* — Brian M O'Hara
(74) *Attorney, Agent, or Firm* — Notaro, Michalos & Zaccaria P.C.

(57) ABSTRACT

A tail located on a helicopter has a front area located on the tail, a rear area connected to the front area in a foldable manner around the axis, and a first shaft at the front area and a second shaft at the rear area allows power transfer to the tail rotor throughout the flight movement of the helicopter. A first coupling and a second coupling are located on the first shaft in a gear form. A first hub on the first shaft surrounds the first coupling and is form-compatible with the first coupling to allow the first coupling to perform at least partially a spherical rotational movement, and a second hub form-compatible with the second coupling located on the second shaft opposite the second coupling.

15 Claims, 4 Drawing Sheets

HELICOPTER TAIL FOLDING SYSTEM

CROSS-REFERENCE

This application claims the benefit of priority to Turkish Patent Application No. 2022/018277, filed Nov. 30, 2022, which is incorporated herein by reference in its entirety.

FIELD

Helicopters commonly used by naval forces may need to fold the tail cone and main rotors in order to occupy less space on a ship. The main rotor is folded from the hinges located at the hub connection, and the tail cone is folded from the horizontal line, where the tail power transmission system passes, perpendicular to the horizontal axis or at a slight angle. While this folding process is performed, the power transmission line of the tail, which transfers power to the tail rotor, must be separated from the folding axis. While the tail is restored, the connection must be re-established. A type of coupling commonly called "face gear" is used for this separation and coupling mechanism. However, this type of coupling has disadvantages such as misalignment, low reliability, limited flexibility, low load carrying capacity and short maintenance intervals.

BACKGROUND

U.S. Pat. No. 6,050,521, which is included in the known-state of the art, discloses a helicopter comprising a main rotor with foldable wings along the body of the helicopter as a whole, and a tail rotor carried by a tail section that can be folded relative to the body. Sleeve is normally maintained in a limit axial position defined by inner teeth contacting guide ring, and by a helical spring coaxial with shaft and compressed between an outer intermediate shoulder of sleeve and an annular supporting element fitted to shaft and axially contacting gear. Sleeve is connected angularly to shaft by a splined coupling interposed between shaft and an intermediate portion of sleeve; and coupling is defined by helical teeth respectively inside sleeve and outside shaft, and which slope slightly by a few degrees with respect to axis D of shaft. More specifically, torque is transmitted from shaft via splined coupling to hub, and from hub to shaft via ring gear and gear; and transmission member is driven by shaft via splined coupling. On account of the helical shape of splined coupling between transmission member and shaft, member, as it slides axially, is rotated sufficiently to offset and so telescopically engage teeth. Spring may thus restore member to the limit position and ensure, in use, sufficient elastic pressure on member to keep it safely coupled with second transmission member. From one end of tubular portion, there extend integrally a flared flange having a flat annular peripheral edge, and a substantially conical supporting portion having a projecting pin of axis A.

SUMMARY

Thanks to a helicopter tail folding system according to the present invention, a more reliable and practical solution is provided for the maintenance, repair, assembly and disassembly of couplings.

Another object of the present invention is to design an easily accessible pin due to a more compact design.

The helicopter tail folding system realized to achieve the object of the invention, which is defined in the first claim and other claims dependent thereon, comprises foldable helicopter tail. There is a front area and a rear area on the tail. The front area is located closer to the nose of the helicopter than the rear area. By means of the first shaft located in the front area and the second shaft located in the rear area, power is transferred to the tail rotor of the helicopter, so that anti-torque is produced against the torque created by the main rotor throughout the flight movement. The front area and rear area are connected to each other by a hinge from a region other than where the first shaft and the second shaft are connected to each other. The rear area is supported by a hinge-like structure to the front area. Therefore, the rear area is made foldable by rotating around the axis where it is supported to the front region. There is a first coupling and a second coupling, preferably in gear form, on the first shaft. The first coupling is preferably surrounded by the first hub, which is in a crown form, and is located on the first shaft such that inner wall of the first hub and periphery of the first coupling are almost completely form-compatible. The first coupling can rotate at least partially spherically on the first shaft. Thus, movement of the first coupling in the first hub is not completely restricted and movement flexibility is provided for the first coupling. The second coupling can be inserted into the second hub provided on the second shaft. Form of the periphery of the second coupling and the form of the inner wall of the second hub are form-compatible. Thanks to the second coupling inserted into the second hub, first shaft and second shaft are connected to each other. When the second shaft is connected to the first shaft, the helicopter is in active mode (A) where power is transferred from the first shaft to the second shaft. Disconnection of the second shaft from the first shaft is achieved by removing the second coupling from the second hub. When the rear area is folded by rotating around the support where it is connected to the front area, the helicopter is in passive mode (P) where the movement transfer from the first shaft to the second shaft is stopped.

The helicopter tail folding system according to the invention comprises a support piece located on an inner wall of the first shaft. The support piece enables the pin holding the first coupling and the second coupling in a centralized manner to be mounted on the first shaft. The second coupling can be held adjacent to the first coupling by means of a pin. Thanks to the nut attached to the pin that holds the first coupling and the second coupling of different sizes in contact with each other at their centers, the first coupling and the second coupling are prevented from moving out of the pin. The nut attached to the pin is directly accessible to the operator when the rear area is folded and helicopter is in passive mode (P). In this way, during maintenance, repair, assembly and disassembly processes of the first coupling, the nut is removed from the pin, so that the operator can easily access first the second coupling and then the first coupling.

In an embodiment of the invention, the helicopter tail folding system comprises first pin region and second pin region that are provided on the pin. The first pin region is located between the second pin and the nut, and enables centering of the first coupling and the second coupling. Depending on length of the first pin region and/or position of the nut, the first coupling and the second coupling together with the first coupling can make spherical movement within the range predetermined/set by the user. The first coupling, which makes a flexible spherical movement during the transition between passive mode (P) and active mode (A) on the first pin region, and the second coupling, which moves together with the first coupling, can also make a linear movement on the first pin region. Limiting the movement of the first coupling and the second coupling can be provided by the second pin region. Thanks to the second pin region, which has a larger cross-sectional area, i.e. thicker, than the first pin region, flexible spherical movement and linear movement of the first coupling within the first hub is at least partially restricted.

In an embodiment of the invention, the helicopter tail folding system comprises stopper, which is at least one protrusion on the pin that separates the first pin region from the second pin region. The stopper may wholly surround the pin. When the first pin region and the second pin region are of the same form and size, the stopper is located on the pin to limit the movement of the first coupling on the first pin region. The stopper may be placed externally or may be produced as a protruding stopper on the pin. The first pin region between the stopper and the nut allows the movement of the first coupling and the second coupling. When the helicopter is switched from passive mode (P) to active mode (A) or from active mode (A) to passive mode (P), the force applied to the second coupling causes the second coupling, and the first coupling together with the second coupling, to move spherically and/or linearly on the first pin region. Thanks to the stopper, length of the first pin region and the mobility of the first coupling and the second coupling can be adjusted.

In an embodiment of the invention, the helicopter tail folding system comprises transmission element extending integrally from the first hub. The transmission element extends along the axis that the first shaft extends, and forms the inner wall of the first shaft. While the helicopter is switching between active mode (A) and passive mode (P), the first hub moves linearly on the axis on which the shaft extends, so that the transmission element moves linearly on the axis on which the shaft extends.

In an embodiment of the invention, the helicopter tail folding system comprises the support piece that extends from the second pin region to enable the second pin region and therefore the first pin region to be mounted to the transmission element. Thanks to the support piece, pin is mounted on the transmission element, and first coupling and second coupling can be centered.

In an embodiment of the invention, the helicopter tail folding system comprises at least one shoulder, which is a protrusion on the transmission element. The shoulder may surround the inner wall of the transmission element. The shoulder enables that the support piece attached to the inner wall of the transmission element does not slide linearly and/or come off. The protrusion-shaped stabilizer on the support piece contacts the protrusion on the shoulder, preventing rotation of the support piece within the transmission element while the nut is attached to the pin.

In an embodiment of the invention, the helicopter tail folding system comprises the transmission element with an inner wall form-compatible with the support piece. Recesses provided on the inner wall of the transmission element to fit the protrusions on the support piece prevent the support piece from slipping and/or moving out of the transmission element.

In an embodiment of the invention, the helicopter tail folding system comprises the support piece that can be rotated to be attached to the transmission element. Conical shape of the support piece facilitates attachment by rotation. The support piece may preferably be a segmented or flat plate.

In an embodiment of the invention, the helicopter tail folding system comprises the first coupling and the second coupling that are produced integrally. Therefore, there is no need for connections that enable assembly of the first coupling and the second coupling.

In an embodiment of the invention, the helicopter tail folding system comprises sealing element that enables protection of the space between the second coupling and the first coupling against liquids and particles such as dust.

In an embodiment of the invention, the helicopter tail folding system comprises the transmission element (a spline) in the form of a helical modified gear, which forms inner wall of the first shaft, rotates with the first hub, and allows first coupling and second coupling to hold each other more effectively, wherein the transmission element extends from the first hub integrally such that the axis on which the first shaft extends is the center, in order to maintain power transfer to the tail which is switched from passive mode (P) to active mode (A).

In an embodiment of the invention, the helicopter tail folding system comprises absorber in contact with the transmission element, which absorbs linear forward and backward movement of the first hub and transmission element into the first shaft while switching them from passive mode (P) to active mode (A). The transmission element and the first shaft at least partially surround the absorber. It comprises the absorber which extends and stretches towards the rear area in the direction it extends from the first shaft to the first coupling, while first coupling and second coupling are switched from active mode (A) to passive mode (P), or which is compressed back towards the front area in the direction it extends from the first shaft to the first coupling, while switching from passive mode (P) to active mode (A), so that first coupling and second coupling are prevented from getting stuck.

In an embodiment of the invention, the helicopter tail folding system comprises the absorber with a size modifiable depending on the force applied to the second coupling. The absorber is held between the first shaft and the transmission element by the protrusions in the transmission element. While switching the helicopter from passive mode (P) to active mode (A), protrusions on the inner wall of the transmission element enable the absorber to be compressed between the first shaft and the transmission element. While switching the helicopter from active mode (A) to passive mode (P) or following the active mode (A), the transmission element is pushed by the absorber by means of the protrusions on the axis where the first shaft extends. Therefore, the absorber is at a free position at the length before compression.

In an embodiment of the invention, the helicopter tail folding system comprises a first hanger bearing that surrounds the transmission element and enables the first shaft to be placed on the front area; and a second hanger bearing connecting the second hub to the rear area.

In an embodiment of the invention, the helicopter tail folding system comprises a hinge that connects the front area to the rear area and allows the rear area to rotate around itself on the axis to which it is attached.

BRIEF DESCRIPTION OF THE DRAWINGS

The helicopter tail folding system realized to achieve the object of the invention is illustrated in the attached drawings, in which.

Figure 1:
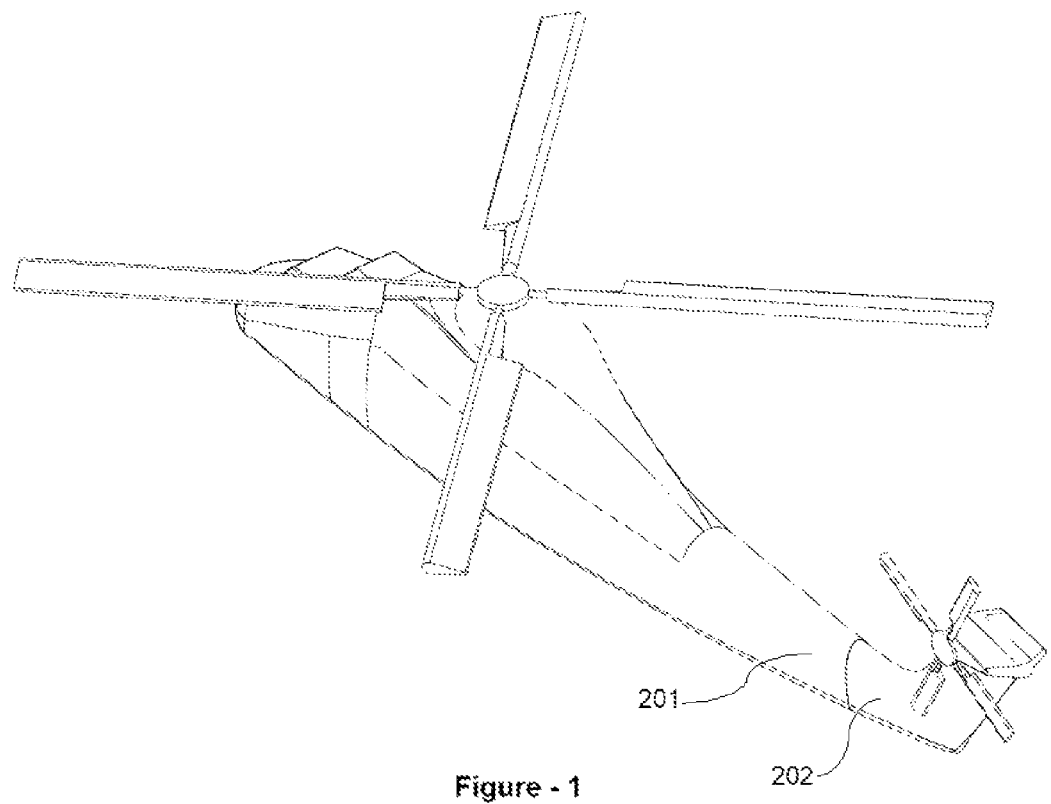
FIG. 1 is a perspective view of the helicopter tail folding system in active mode (A).

All the parts illustrated in figures are individually assigned a reference numeral and the corresponding terms of these numbers are listed below:

1. Helicopter Tail Folding System
2. Tail
   201. Front Area
   202. Rear Area
3. First Shaft
4. Second Shaft
5. First Coupling
6. Second Coupling
7. First Hub
8. Second Hub
9. Support Piece
10. Pin
    101. First Pin Region
    102. Second Pin Region
11. Nut
12. Stopper
13. Transmission Element
14. Shoulder
15. Stabilizer
16. Sealing Element
17. Absorber
18. First Hanger Bearing
19. Second Hanger Bearing
20. Hinge
    (A) Active Mode
    (B) Passive Mode

DETAILED DESCRIPTION

Helicopter tail folding system (1) comprises a tail (2) located on a helicopter; a front area (201) located on the tail (2); a rear area (202) connected to the front area (201) in a foldable manner around the axis on which it is supported; a first shaft (3) at the front area (201) and a second shaft (4) at the rear area (202) that allow power transfer to the tail (2) rotor throughout the flight movement of the helicopter; a first coupling (5) and a second coupling (6) that are located on the first shaft (3) in a gear form; a first hub (7) on the first shaft (3), which surrounds the first coupling (5) and is form-compatible with the first coupling (5) so as to allow the first coupling (5) to perform at least partially a spherical rotational movement; a second hub (8) form-compatible with the second coupling (6) and located on the second shaft (4) opposite the second coupling (6); an active mode (A) in which power transfer from the first shaft (3) to the second shaft (4) is provided when the second coupling (6) is placed into the second hub (8); a passive mode (P) in which power transfer from the first shaft (3) to the second shaft (4) is prevented when the rear area (202) is folded to disconnect the second coupling (6) from the second hub (8).

Figure 2:
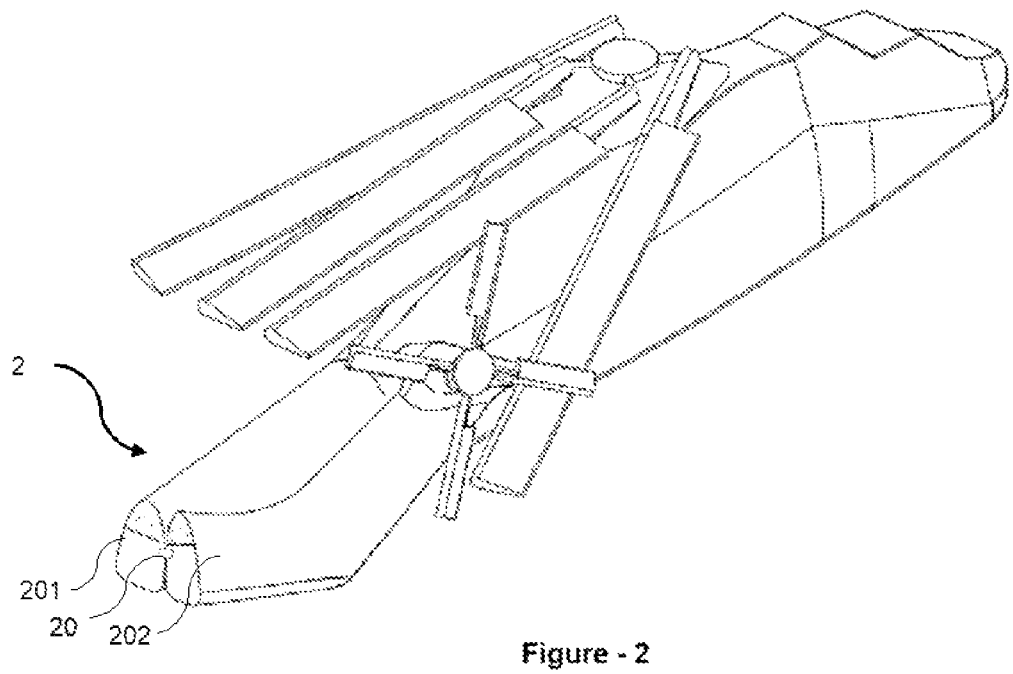
FIG. 2 is a perspective view of the helicopter tail folding system in passive mode (P).

Helicopter tail folding system (1) according to the invention comprises a support piece (9) located on an inner wall of the first shaft (3); a pin (10) that extends from the support piece (9) for mounting the second coupling (6) to the first coupling (5), and centers the first coupling (5) and the second coupling (6); at least one nut (11) which is attached removably to the pin (10) for the assembly/maintenance of the first coupling (5), and located on the second coupling (6) so as to be directly accessible by the user in passive mode (P) (FIG. 1, FIG. 2).

On the helicopter tails (2), there is a front area (201) close to the main rotor and a rear area (202) that can be folded by rotating around an axis where it is connected to the front area (201). A first shaft (3) that transfers power to the helicopter rotor during a flight is located in the front area (201), and a second shaft (4) that provides movement transfer is located in the rear area (202). A first coupling (5) having a gear form and a second coupling (6) having a gear form are located on the first shaft (3). There is a first hub (7) on the first shaft (3) that surrounds the first coupling (5) in a form-compatible manner with the first coupling (5) and allows the first coupling (5) to make a spherical rotational movement around its own center; a second hub (8) located on the second shaft (4) in a form-compatible manner with the second coupling (6), wherein the first coupling (5) and second coupling (6) are located opposite each other. There is an active mode (A) in which the first shaft (3) and the second shaft (4) provide power transfer when the second coupling (6) is placed in the second hub (8). There is a passive mode (P) in which the rear area (202) is rotated around the axis on which it is supported, so as to be moved to the front area (201) and away from the front area (201), and in which the second coupling (6) is disconnected from the second hub (8), thereby preventing power transfer from the first shaft (3) to the second shaft (4).

Figure 3:
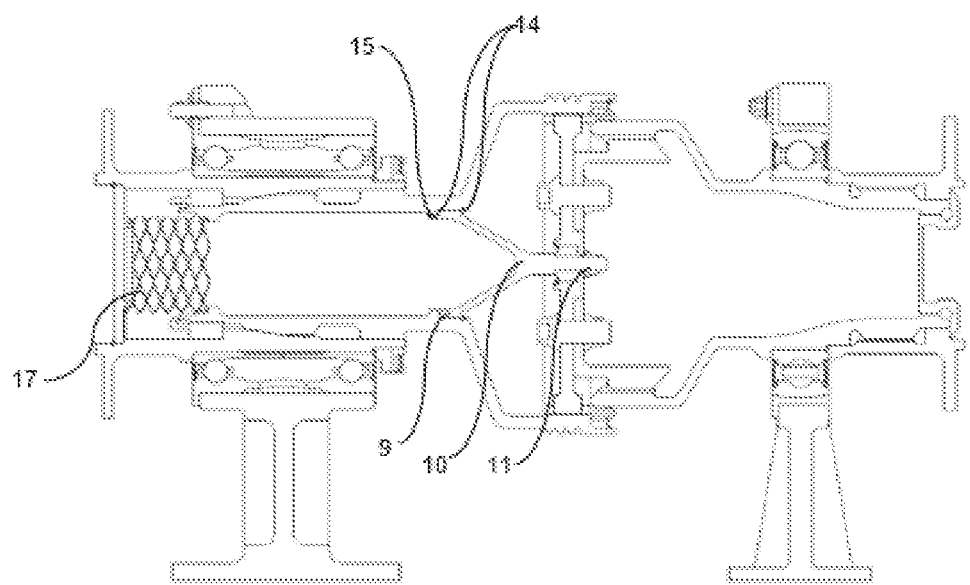
FIG. 3 is a cross-sectional view of the helicopter tail folding system.
Figure 4:
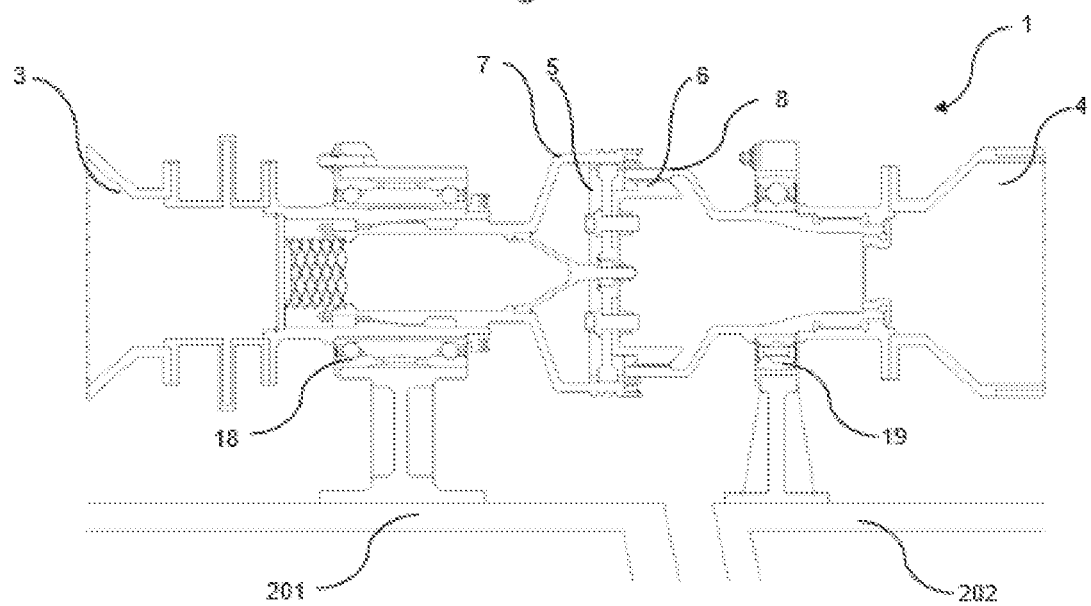
FIG. 4 is a cross-sectional view of the helicopter tail folding system

It comprises a support piece (9) mounted on the inner wall of the first shaft (3); and a pin (10) extending from the support piece (9) to hold the second coupling (6) on the first coupling (5). The pin (10) holds the first coupling (5) and the second coupling (6) from their centers to keep them in the first hub (7) adjacent to each other. Further, the nut (11) is attached to the pin (10) to prevent the first coupling (5) and the second coupling (6) from moving out of the pin (10). The nut (11) on the pin (10) is directly accessible to the operator when the tail (2) is folded, that is, in passive mode (P). In this way, the first coupling (5) in need of frequent maintenance can be easily accessed or visually inspected by the operator for assembly/disassembly (FIG. 3, FIG. 4).

In an embodiment of the invention, the helicopter tail folding system (1) comprises a first pin region (101) on the pin (10), in which the first coupling (5) and the second coupling (6) are centered; a second pin region (102) on the pin (10), which at least partially restricts spherical movement of the first coupling (5) on the first pin region (101), thereby enabling the first coupling (5) and the first hub (7) to overlap. Thanks to the partially flexible spherical movement of the first coupling (5) within the first hub (7), couplings and hub are prevented from damage during the transitions between passive mode (P) and active mode (A). Moreover, thanks to the second pin region (102) blocking the first coupling (5), linear movement is restricted during the transition from passive mode (P) to active mode (A) and the second coupling (6) is enabled to fit tightly into the second hub (8) (FIG. 3, FIG. 4).

Figure 7:
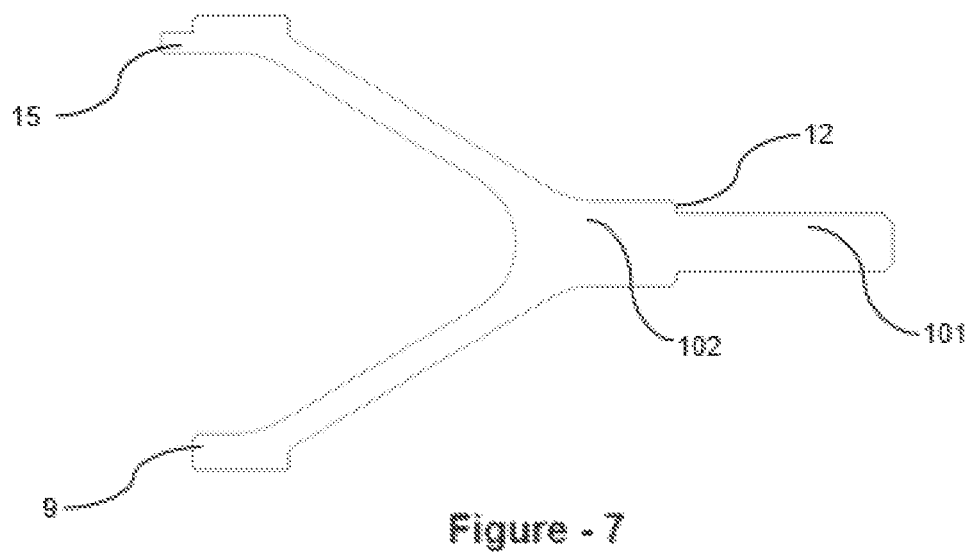
FIG. 7 is a cross-sectional view of the pin.

In an embodiment of the invention, the helicopter tail folding system (1) comprises at least one stopper (12) which is a protrusion between the first pin region (101) and the second pin region (102), in order to at least partially restrict the spherical movement of the first coupling (5) and the second coupling (6) on the first pin region (101). Thus, distance of the first pin region (101) between the stopper (12) and the nut (11) can be determined by the user and movement of the first coupling (5) and the second coupling (6) moving together with the first coupling (5) can be restricted (FIG. 7).

Figure 5:
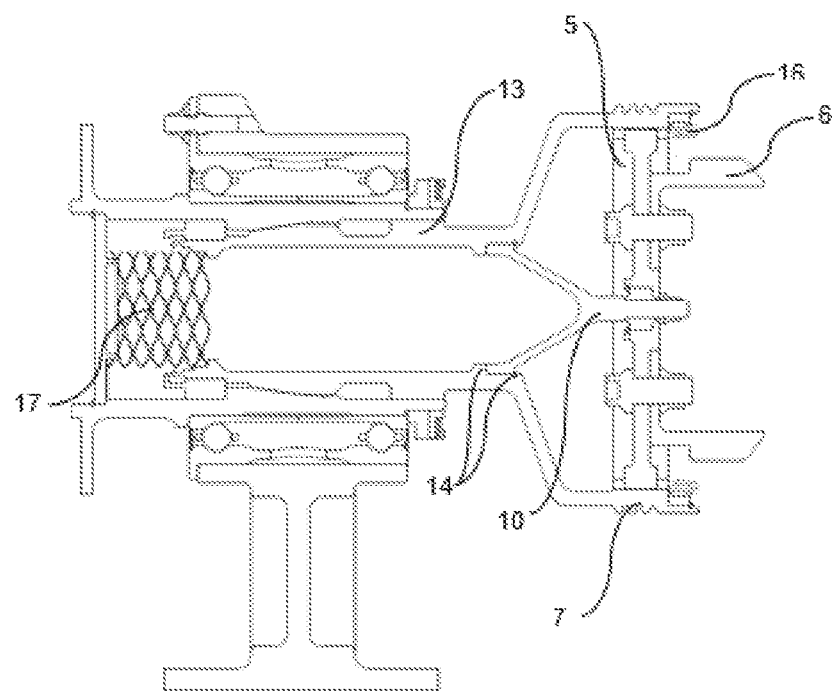
FIG. 5 is a cross-sectional view of the first shaft, first coupling, second coupling, first hub and pin.

In an embodiment of the invention, the helicopter tail folding system (1) comprises a transmission element (13) extending from the first hub (7) integrally, with the axis on which the first shaft (3) extends being the center, wherein the transmission element (13) forms inner wall of the first shaft (3). Thanks to the integral production of the first coupling (5) and the second coupling (6), a shorter folding tail (2) is produced, thereby providing a lighter tail (2). Producing the transmission element (13) and the first hub (7) integrally enables a more compact structure because, when the helicopter is in passive mode (P), the nut (11), therefore the first coupling (5), the second coupling (6), the pin (10) and the support piece (9) that are located in the first hub (7) and the transmission element (13) are easily accessible by the operator (FIG. 5).

In an embodiment of the invention, the helicopter tail folding system (1) comprises the support piece (9) extending from the second pin region (102) to the transmission element (13) and enabling the pin (10) to be mounted on the transmission element (13). Thanks to the removable attachment of the support piece (9) to the transmission element (13), the pin (10) can be replaced easily by the operator (FIG. 3, FIG. 4, FIG. 5).

In an embodiment of the invention, the helicopter tail folding system (1) comprises at least one shoulder (14), which is a protrusion on the transmission element (13) and prevents linear movement of the support piece (9) in the transmission element (13) in the direction of the first shaft (3); at least one stabilizer (15) extending from the support piece (9) and preventing rotational movement of the support piece (9) within the transmission element (13) due to its contact with the protrusion on the shoulder (14). Thanks to the shoulder (14), the support piece (9) is prevented from moving freely on the transmission element (13), and thanks to the stabilizer (15), the pin (10) is prevented from rotating freely while the nut is torqued (FIG. 3, FIG. 4).

In an embodiment of the invention, the helicopter tail folding system (1) comprises the support piece (9) with protrusions thereon; the transmission element (13) with a recessed inner wall compatible with the protrusions on the support piece (9). Since the protrusions and recesses are form-compatible with each other, the support piece (9) is prevented from moving freely on the transmission element (13) (FIG. 3, FIG. 4).

In an embodiment of the invention, the helicopter tail folding system (1) comprises the support piece (9) which has a conical form, thus attached to the inner wall of the transmission element (13) by rotating. The support element (9), which can be rotated in a practical manner so as to be removed and attached to the transmission element (13), may preferably have a conical form. Thanks to the conical shaped support element (9), the second pin region (102) can be produced short in length. As the support element (9) is removable and attachable, when the pin (10) is required to be changed or damaged, it can be easily replaced with a new one. Thanks to the conical shaped support piece (9), the support element (9) is easily attached in the transfer element (13).

In an embodiment of the invention, the helicopter tail folding system (1) comprises the first coupling (5) and the second coupling (6), which are integral. Therefore, extra elements and connectors are not required to hold the first coupling (5) and the second coupling (6) together, which move together in active mode (A), passive mode (P) and during mode transitions. Therefore, a more compact and lightweight structure is achieved. Due to the force applied to the first coupling (5) or the second coupling (6), the connection therebetween is not damaged and maintenance period is decreased.

In an embodiment of the invention, the helicopter tail folding system (1) comprises a sealing element (16) located between the first coupling (5) and the second coupling (6). The sealing element (16) prevents foreign substances, such as water and dust, from entering into the first shaft (3) located between the first coupling (5) and the second coupling (6) (FIG. 5).

In an embodiment of the invention, the helicopter tail folding system (1) comprises the transmission element (13) in helical form, which forms the inner wall of the first shaft (3), moves by rotating with the first hub (7) and supports the first coupling (5) and the second coupling (6) to be held together, wherein for the tail (2) switched from passive mode (P) to active mode (A), the transmission element (13) extends integrally from the first hub (7) with the axis where the first shaft (3) extends being the center. Thanks to its helical form, the transmission element (13) moves with the first hub (7) by rotating, and allows the first coupling (5) and the second coupling (6) to be held together by means of the support element (9). Since the helically modified transmission element (3) moves forward towards the rear area (202) in the direction it extends from the first shaft (3) to the first coupling (5) while the first coupling (5) and the second coupling (6) are switched from active mode (A) to passive mode (P), or moves back towards the front area (201) in the direction it extends from the first shaft (3) to the first coupling (5) while switching from passive mode (P) to active mode (A), the first coupling (5) and second coupling (6) can be prevented from getting stuck (FIG. 3, FIG. 4).

In an embodiment of the invention, the helicopter tail folding system (1) comprises an absorber (17) located in the first shaft (3) so as to be in contact with the transmission element (13); the absorber (17) at least partially absorbing the movement of the first hub (7) into the first shaft (3), thus absorbing linear movement of the first hub (7) together with the transmission element (13) during the transition from passive mode (P) to active mode (A). Thanks to the absorber (17) in the form of a wave spring, more effective absorbing is provided in a shorter distance. Thanks to the absorber (17), first coupling (5) and second coupling (6) are prevented from getting stuck, and while switching from passive mode (P) to active mode (A), the second hub (8) slides from the teeth of the second coupling (6) to be inserted into the first hub (7), facilitating the linear movement of the first hub (7) on the axis on which the first shaft (3) extends. A small volume helicopter tail folding system (1) has been provided since a part of the absorber (17) is inside the first shaft (3), and another part thereof is inside the transmission element (13) (FIG. 1, FIG. 2, FIG. 3, FIG. 4).

In an embodiment of the invention, the helicopter tail folding system (1) comprises the absorber (17) which is stretched towards the rear area (202) in the direction it extends from the first shaft (3) to the first coupling (5), while the helicopter is switched from active mode (A) to passive mode (P), or which is compressed in the direction it extends from the first shaft (3) to the first coupling (5), while the helicopter is switched from passive mode (P) to active mode (A), so that the load transferred to the front area (201) is at least partially absorbed. By moving the absorber (17) from the first shaft (3) towards the first coupling (5), in the direction where the first shaft (3) extends, the load transferred to the front area (201) is reduced. Thanks to the helical modification of the transmission element (13) and to the damper (17), load distributions on the rear area (202) and the front area (201) can be homogeneous during transitions of the helicopter between active mode (A) and passive mode (P) (FIG. 5).

Figure 6:
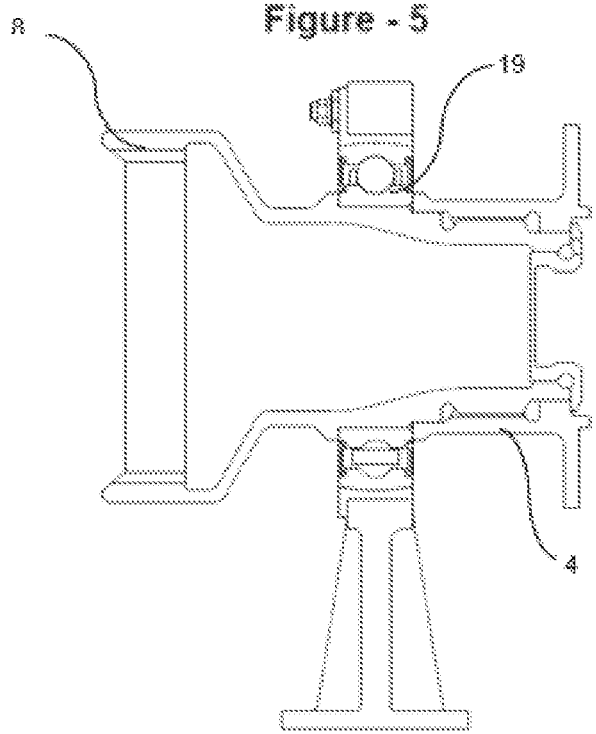
FIG. 6 is a cross-sectional view of the second shaft and second hub.

In an embodiment of the invention, the helicopter tail folding system (1) comprises a first shaft (3) surrounding the transmission element (13); a first hanger bearing (18) that enables the first shaft (3) to be mounted the front area (201); a second hanger bearing (19) that enables the second hub (8) and the second shaft (4) to be mounted to the rear area (202). The first hanger bearing (18) bears the first shaft (3) and the second hanger bearing (19) bears the second hub (8) in the rear area (202). Thanks to the first hanger bearing (18), the first shaft (3) can be mounted to the front area (201) so as to rotate independently of the front area (201). Likewise, thanks to the second hanger bearing (19), the second shaft (4) can be mounted to the rear area (202) so as to rotate independently of the rear area (202) (FIG. 5, FIG. 6).

In an embodiment of the invention, the helicopter tail folding system (1) comprises a hinge (20) that connects the front area (201) and the rear area (202) and allows the rear area (202) to rotate around the axis to which it is connected. While the helicopter tail (2) is folded, that is, during the transition from active mode (A) to passive mode (P), first shaft (3) and second shaft (4) are disconnected. The hinge (20), which connects the rear area (201) holding the second shaft (4) and the front area (201) holding the first shaft (3) to each other, is separated by rotating around its axis, so that the connection is interrupted. In this way, rear area (202) of the tail (2) can be folded and separated from the front area (201) of the tail (2) except for the hinge (20).

What is claimed is:

1. A helicopter tail folding system (1) comprising:
    a tail (2) located on a helicopter;
    a front area (201) located on the tail (2);
    a rear area (202) connected to the front area (201) in a foldable manner around an axis on which it is supported;
    a first shaft (3) at the front area (201) and a second shaft (4) at the rear area (202) that allow power transfer to a tail rotor throughout a flight movement of the helicopter;
    a first coupling (5) and a second coupling (6) that are located on the first shaft (3) in a gear form;
    a first hub (7) on the first shaft (3), which surrounds the first coupling (5) and is form-compatible with the first coupling (5) so as to allow the first coupling (5) to perform a spherical rotational movement;
    a second hub (8) form-compatible with the second coupling (6) and located on the second shaft (4) opposite the second coupling (6);
    a support piece (9) located on an inner wall of the first shaft (3);
    a pin (10) that extends from the support piece (9) for mounting the second coupling (6) to the first coupling (5), and centers the first coupling (5) and the second coupling (6); and
    at least one nut (11) which is attached removably to the pin (10) for assembly/maintenance of the first coupling (5) and located on the second coupling (6) so as to be directly accessible in passive mode (P); and
    wherein the helicopter tail folding system is configured to have
        an active mode (A) in which power transfer from the first shaft (3) to the second shaft (4) is provided when the second coupling (6) is placed into the second hub (8); and
        a passive mode (P) in which power transfer from the first shaft (3) to the second shaft (4) is prevented when the rear area (202) is folded to disconnect the second coupling (6) from the second hub (8).

2. The helicopter tail folding system (1) according to claim 1, comprising:
    a first pin region (101) on the pin (10), in which the first coupling (5) and the second coupling (6) are centered; and
    a second pin region (102) on the pin (10), which restricts spherical movement of the first coupling (5) on the first pin region (101), thereby enabling the first coupling (5) and the first hub (7) to overlap.

3. The helicopter tail folding system (1) according to claim 2, comprising at least one stopper (12) which is a protrusion between the first pin region (101) and the second pin region (102), and restricts the spherical movement of the first coupling (5) and the second coupling (6) on the first pin region (101).

4. The helicopter tail folding system (1) according to claim 1, comprising a transmission element (13) integrally extending from the first hub (7), being centered with the axis on which the first shaft (3) extends, and wherein the transmission element (13) forms an inner wall of the first shaft (3).

5. A helicopter tail folding system (1) according to claim 4, wherein the support piece (9) extends from a second pin region (102) to the transmission element (13) and enables the pin (10) to be mounted on the transmission element (13).

6. The helicopter tail folding system (1) according to claim 4, comprising:
    at least one shoulder (14), which is a protrusion on the transmission element (13) to prevent linear movement of the support piece (9) in the transmission element (13) in a direction of the first shaft (3); and
    at least one stabilizer (15) extending from the support piece (9) to prevent rotational movement of the support piece (9) within the transmission element (13) due to its contact with the protrusion on the shoulder (14).

7. The helicopter tail folding system (1) according to claim 4, wherein the support piece (9) has protrusions thereon, and the transmission element (13) with a recessed inner wall is compatible with the protrusions on the support piece (9).

8. The helicopter tail folding system (1) according to claim 4, wherein the support piece (9) has a conical form and is threadedly attached to the inner wall of the transmission element (13).

9. The helicopter tail folding system (1) according to claim 1, wherein the first coupling (5) and the second coupling (6) are integrated together.

10. The helicopter tail folding system (1) according to claim 1, comprising a sealing element (16) located between the first coupling (5) and the second coupling (6).

11. The helicopter tail folding system (1) according to claim 4, wherein the transmission element (13) has a helical form which forms the inner wall of the first shaft (3) and which is configured to move by rotating with the first hub (7), and which holds the first coupling (5) and the second coupling (6) together, and wherein, for the tail (2) in active mode (A), the transmission element (13) extends integrally from the first hub (7) along an axis of the first shaft (3).

12. The helicopter tail folding system (1) according to claim 4, comprising:
- an absorber (17) located in the first shaft (3) so as to be in contact with the transmission element (13), the absorber (17) at least partially absorbing movement of the first hub (7) into the first shaft (3) and thus absorbing linear movement of the first hub (7) together with the transmission element (13) during a transition from passive mode (P) to active mode (A).

13. The helicopter tail folding system (1) according to claim 12, wherein the absorber (17) is configured to be:
- stretched towards the rear area (202) from the first shaft (3) to the first coupling (5) while the helicopter is switched from active mode (A) to passive mode (P), or
- compressed while the helicopter is switched from passive mode (P) to active mode (A), so that a load transferred to the front area (201) is at least partially absorbed.

14. The helicopter tail folding system (1) according to claim 4,
- wherein the first shaft (3) surrounds the transmission element (13), and
- further comprising a first hanger bearing (18) that enables the first shaft (3) to be mounted the front area (201), and a second hanger bearing (19) that enables the second hub (8) and the second shaft (4) to be mounted to the rear area (202).

15. The helicopter tail folding system (1) according to claim 1, comprising a hinge (20) connecting the front area (201) and the rear area (202) and allowing the rear area (202) to rotate around the axis to which it is connected.

* * * * *